United States Patent [19]

Doi

[11] Patent Number: 5,424,380

[45] Date of Patent: * Jun. 13, 1995

[54] RESIN COMPOSITION

[75] Inventor: Toru Doi, Mie, Japan

[73] Assignee: Tosoh Corporation, Yamaguchi, Japan

[*] Notice: The portion of the term of this patent subsequent to May 4, 2010 has been disclaimed.

[21] Appl. No.: 967,879

[22] Filed: Oct. 29, 1992

[30] Foreign Application Priority Data

Oct. 31, 1991 [JP] Japan .................................. 3-311355
Oct. 31, 1991 [JP] Japan .................................. 3-311356
Oct. 31, 1991 [JP] Japan .................................. 3-311357
Nov. 22, 1991 [JP] Japan .................................. 3-332947

[51] Int. Cl.⁶ .................. C08F 222/40; C08F 210/00; C08L 39/00
[52] U.S. Cl. .................................. 526/262; 526/348; 525/217
[58] Field of Search .................. 526/262, 348; 525/217

[56] References Cited

U.S. PATENT DOCUMENTS

| 4,386,176 | 5/1983 | Fukuda et al. | 525/68 |
| 5,208,307 | 5/1993 | Doi et al. | 526/262 |

FOREIGN PATENT DOCUMENTS

| 0062189 | 10/1982 | European Pat. Off. |
| 0128775 | 12/1984 | European Pat. Off. |
| 0267574 | 5/1988 | European Pat. Off. |
| 0474036 | 3/1992 | European Pat. Off. |
| 59-011322 | 1/1984 | Japan |
| 4031407 | 2/1992 | Japan |
| 4031408 | 2/1992 | Japan |
| 4053810 | 2/1992 | Japan |
| 1262049 | 2/1972 | United Kingdom |

OTHER PUBLICATIONS

Abstract of JP 59-011322.
Abstract of JP 4-031407.
Abstract of JP 4-031408.
Abstract of JP 4-053810.

Primary Examiner—Joseph L. Schofer
Assistant Examiner—Wu C. Cheng
Attorney, Agent, or Firm—Nixon & Vanderhye

[57] ABSTRACT

Resin compositions having excellent heat resistance, izod impact strength, rigidity and dimensional resistance and the like, applied in the fields of the automobile, electric and electronic, and the like industries. The resin composition comprising: a) a resin in which 30 to 98 mole % of the component (I) are contained in the whole polymer and 70 to 2 mole % of the component (II) are contained in the whole polymer, its weight-average molecular weight converted into that of polystyrene being $1 \times 10^3$ or more to $5 \times 10^6$ or less, and b) an olefin resin; then the a)/b) content being 5/95 to 99/1 as a weight ratio,

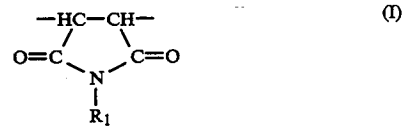

(I)

wherein $R_1$ is an alkyl group having 1 to 18 carbon atom(s) or a cycloalkyl group having 3 to 12 carbon atoms; and

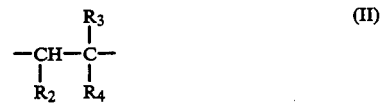

(II)

wherein $R_2$ is hydrogen or an alkyl group having 1 to 8 carbon atom(s), and $R_3$ and $R_4$ is an alkyl group having 1 to 8 carbon atoms.

9 Claims, 1 Drawing Sheet

FIG. 1

(EXAMPLE 9)

FIG. 2

(COMPARATIVE EXAMPLE 5)

RESIN COMPOSITION

BACKGROUND OF THE INVENTION

1. Field of the Invention

The present invention relates to a resin composition comprising an N-alkyl-substituted maleimide/olefin copolymer and a specified resin, which has excellent heat resistance, rigidity, izod impact strength, weather resistance and dimensional resistance.

2. Description of the Related Art

Recently, various high-performance resins have been actively developed with progress of the polymer-alloying technology. This development have rapidly enabled us to plasticize materials which had not been applied. In particular, the plasticization has intensively studied in the field of the automobile, electric and electronic industries and, for example, the plasticization of the automobile body which has been made up by steels is studied. Although the alloy of polycarbonates and ABS has been once adopted, there are problems on productivity, color tone and the like because the alloy with poor heat resistance is coated off-line.

GE Company has developed an alloy of a polyamide and a polyphenylene oxide. Although this material has improved water absorption properties as well as changes in dimension and physical properties compared with the polyamide itself, there are many problems of insufficient physical properties, as well as low rigidity, poor weather resistance and the like which derive from some defects of amides.

Having low weather resistance and other good physical properties, polyesters such as a polybutylene terephthalate have been studied to blend with a variety of resins such as a polyphenylene oxide, a polycarbonate and an elastomer. However, these blending does not provide the resins with satisfactory, combined properties of heat resistance, rigidity, izod impact strength and the like.

On the other hand, maleimide copolymers with large heat resistance have been studied for various methods of blending. For example, a method in which methyl methacrylate is copolymerized with an N-aromatic-substituted maleimide is disclosed in Japanese Patent Publication No. 43-9753, Japanese Patent Laid-Open Nos. 61-141715, 61-171708 and 62-109811; and a method in which styrene resins are copolymerized with an N-aromatic-substituted maleimide is disclosed in Japanese Patent Laid-Open Nos. 47-6891, 61-76512 and 61-276807. Although the resins obtained by these methods, however, have larger heat resistance with the increased content of N-aromatic-substituted maleimides, there are problems that they are very fragile, poor in processability and colored easily. Thus these N-aromatic-substituted maleimides are only blended in a small amount as heat resistance modifiers to acrylonitrile-/butadiene/styrene (ABS) resin.

For prevention of decrease in mechanical strength of the resins by increasing maleimide units, for example, a method for graft-polymerizing phenylmaleimide and styrene to rubber-like material, or a method for kneading them with rubber-like material is described in, for example, Japanese Patent Laid-Open Nos. 58-206657, 59-11322 and 59-49255. Since the heat resistance and rigidity of the resins was decreased by introducing rubber components using these methods to increase their izod impact strength, it is difficult to satisfy the heat resistance, izod impact strength and rigidity at the same time. Further, use of the resins with light color is limited because of coloring molded objects. Compositions of such materials and polyamide resins are also described in Japanese patent Laid-Open Nos. 62-59647 and 62-179546, thought it was also difficult to satisfy the heat resistance, izod impact strength and rigidity of them at the same time.

Although N-alkyl-substituted maleimide/olefin copolymers are interesting polymers which have the properties such as good heat resistance and weather resistance, high rigidity, and practical mechanical strength, it is desired to further improve the izod impact strength of the resins, and improvement of changes in physical properties and change in dimension by water absorption is also desired. Further, Japanese Patent Publication No. 49-12576 describes a resin composition of maleimide-olefin compound, a simple blend, is not made up by a reaction (interaction), so that it is improved a little for flexural stiffness and izod impact strength.

SUMMARY OF THE INVENTION

Accordingly, an object of the present invention is to provide resin compositions with excellent heat resistance, rigidity, izod impact strength, weather resistance, dimensional resistance and the like.

As a result of intensive research to overcome this problem, the present inventors have found a resin comprising an N-alkyl-substituted maleimide/olefin copolymer and a specified resin, which satisfies the above-mentioned object to achieve the present invention.

In order to achieve the object, according to one aspect of the present invention, there is provided a heat-resistance resin composition comprising:

a) a resin in which 30 to 98 mole % of the following component (I) are contained in the whole polymer and 70 to 2 mole % of the following component (II) are contained in the whole polymer, its weight-average molecular weight converted into that of polystyrene being $1 \times 10^3$ or more to $5 \times 10^6$ or less, and b) an olefin resin; then the a)/b) content being 5/95 to 99/1 as a weight ratio, wherein $R_1$ is an alkyl group having 1 to 18 carbon atom(s) or a cycloalkyl group having 3 to 12 carbon atoms; and wherein $R_2$ is hydrogen or an alkyl group having 1 to 8 carbon atom(s), and $R_3$ and $R_4$ is an alkyl group having 1 to 8 carbon atoms.

According to another aspect of the present invention, there is provided a resin composition comprising: a) the same resin as the above-mentioned, and b) an modified elastomer, the a)/b) content being 5/95 to 99/1 as a weight ratio; a resin composition comprising: a) 1 to 99% by weight of the same resin as the above-mentioned, and b) 1 to 99% by weight of a polyamide resin, and c) 0 to 40% by weight of an elastomer; and a resin composition comprising: a) 1 to 99% by weight of the same resin as the above-mentioned; and b) 1 to 99% by weight of a polyester resin, and c) 0 to 40% by weight of an elastomer.

As described clearly in the following Examples, since the resin compositions of the present invention have excellent heat resistance, izod impact strength, rigidity and dimensional resistance and good mechanical strength, they are usefully applied in the various fields of the automobile, electric and electronic, aeronautic and shipping, residential, medical, food and the like industries.

DETAILED DESCRIPTION OF THE INVENTION AND PREFERRED EMBODIMENTS

The resin compositions of the present invention have combined excellent heat resistance, rigidity, izod impact strength, weather resistance and dimensional resistance. Then the present invention is illustrated below.

The resin a) making up the resin composition of the present invention can be prepare by radical polymerization of the N-alkyl-substituted maleimide and the olefin.

Examples of the N-alkyl-substituted maleimide include N-methylmaleimide, N-ethylmaleimide, N-n-propylmaleimide, N-i-propylmaleimide, N-n-butylmaleimide, N-i-butylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclohexylmaleimide and the like; and more preferably N-methylmaleimide, N-ethylmaleimide, N-isopropylmaleimide or N-cyclohexylmaleimide. Further, one or more compounds of them can be used in combination.

Examples of the olefin include isobutene, 2-methyl-1-butene, 2-methyl-1-pentene, 2-methyl-1-hexene, 1-methyl-1-heptene, 1-isooctene, 2-methyl-1-octene, 2-ethyl-1-pentene, 2-methyl-2-butene, 2-methyl-2-pentene, 2-methyl-2-hexene and the like, and more preferably isobutene. Further, one or more compounds of them can be used in combination.

The content of the component (I) is 30 to 98 mole %, preferably 40 to 85 mole %, and more preferably 45 to 75 mole %. When the content of the component (I) is more than 98 mole %, fragile polymers are prepared. But in contrast when the content is less than 30 mole %, polymers with decreased heat resistance are undesirably prepared. Such the content of the components may be appropriately determined by adjusting the amount of the above-mentioned compounds to be used in the reaction of them.

The above-mentioned resin a) may preferably have been further modified with reactive groups. Examples of these reactive groups include carboxylic acid and derivatives thereof, acid anhydride, epoxy, amino, hydroxyl, thiol, alkoxysilyl and isocyanate groups. Then the content of the reactive group is 0 to 25 mole %, preferably 0.01 to 20 mole %, and more preferably 0.02 to 5 mole %. When the content of the reactive group is more than 25 mole %, a resin tends to be undesirably prepared, with decreased heat stability and mechanical strength.

The thus modified resins can be prepared by copolymerization or graft polymerization of the following monomers: for example, maleic anhydride, citraconic anhydride, itaconic anhydride, acrylic acid, methacrylic acid, itaconic acid, glycidyl acrylate, glycidyl methacrylate, aminoethyl acrylate, aminoethyl methacrylate, hydroxyethyl acrylate, hydroxyethyl methacrylate, triethoxysilylpropyl acrylate, triethoxysilylpropyl methacrylate, aminostyrene, allylamine and the like.

Further, reactive groups can be introduced to polymers at their ends using initiators with the reactive groups such as 4,4'-azobis(4-cianovaleric acid), 2,2'-azobis (2-cianopropanol) and 2,2'-azobisisobutylamide, or using chain transfer agents with the reactive groups such as mercaptoacetic acid and mercaptopropionic acid.

As described below, if the resin a) is obtained by subjecting a copolymer of maleic anhydride and an olefin to after-imidation, adjustment of the imidation amount can make acid anhydride units remain.

These reactive groups can be selected depending on the reactive groups of the specified resin described below.

If necessary, other monomers may be subjected to copolymerization without departing from the objects of the present invention. Examples of the other vinyl monomers include styrene, α-methylstyrene, vinyltoluene, 1,3-butadiene, isoprene and halogen-substituted derivatives thereof; methacrylic esters such as methyl methacrylate, ethyl methacrylate, cyclohexyl methacrylate, phenyl methacrylate and benzyl methacrylate; acrylic esters such as methyl acrylate, ethyl acrylate, butyl acrylate, cyclohexyl acrylate, phenyl acrylate and benzyl acrylate; vinyl esters such as vinyl acetate and vinyl benzoate; vinyl ethers such as methyl vinyl ether, ethyl vinyl ether, propyl vinyl ether and butyl vinyl ether; and one or more compounds selected from the group consisting of vinyl chloride, vinylidene chloride, maleic anhydride, N-phenylmaleimide, N-carboxyphenylmaleimide, acrylonitrile, ethylene, propylene, 1-butene, 2-butene and 1-hexene.

For polymerization of these monomers, any methods for the publicly known polymerization, for example, bulk polymerization, solution polymerization, suspension polymerization and emulsion polymerization can be applied.

Examples of polymerization initiators include organic peroxides such as benzoyl peroxide, lauryl peroxide, octanoil peroxide, acethyl peroxide, di-t-butyl peroxide, t-butyl cumpyl peroxide, dicumyl peroxide, t-butyl peroxyacetate and t-butylperoxy benzoate; or azo initiators such as 2,2'-azobis(2,4-dimethylvaleronitrile), 2,2'-azobis(2-butylonitrile), 2,2'-azobisisobutylonitrile, dimethyl-2,2'-azobisisobutylate and 1,1'-azobis(cyclohexane-1-carbonitrile).

Examples of the solvents which can be used in the solution polymerization include benzene, toluene, xylene, ethylbenzene, cyclohexane, dioxane, tetrahydrofuran, acetone, methyl ethyl ketone, dimethylformamide, isopropyl alcohol, butyl alcohol and the like.

The polymerization temperature can be appropriately adjusted depending on the decomposition temperature of the initiators, then it is usually preferred to adjust between 40° and 150° C.

The above-mentioned resins may be also obtained by subjecting the resins from copolymerization of maleic anhydride and olefins to after-imidation with alkylamine and the like. The after-imidation is performed by melting, for example, a maleic anhydride/isobutene copolymer, or dissolving or dispersing the copolymer in alcoholic solvents such as methanol, ethanol and propanol, or aromatic solvents such as benzene and toluene; then by reacting with primary amines such as methyl amine and the like at a temperature of 100° to 350° C.

Then, weight-average molecular weight (MW) of the resin prepared can be determined by gel permeation chromatography (GPC). The molecular weight of a maleimide copolymer is $1 \times 10^3$ or more to $1 \times 10^6$ or less, and more preferably $1 \times 10^5$ or more to $1 \times 10^6$ or less. If the molecular weight is more than $5 \times 10^6$ the resulting resin tends to have poor molding properties; and if that is less than $1 \times 10^3$, the resin tends to become fragile.

Since those N-alkyl-substituted maleimide/olefin copolymers are materials which have excellent heat resistance, good weather resistance, practical mechanical strength and very high rigidity, compositions with better physical properties can be obtained by use of those materials.

Examples of the olefin resins used in the resin compositions of the present invention include a polyethylene, a polypropylene, poly-4-methyl-1-pentene and modified substances thereof. The polyethylene used in the compositions of the present invention, which is a resin mainly composed by ethylene units, is defined as a polymer in which 60 mole % or more, preferably 80 mole % or more, and more preferably 90 mole % or more of the ethylene units are contained in the whole resin.

The polyethylenes which can be used as olefin resins according to the present invention may be subjected to copolymerization or graft polymerization with other unsaturated monomers capable of copolymerization, for example, α-olefins such as propylene, 1-butene and 1-hexene; vinyl ethers; vinyl esters such as vinyl acetate and vinyl propyonate; acrylic esters; methacrylic esters; acrylonitrile and the like, the amounts of which are in the ranges of 0 to 40 mole %, preferably 0 to 25 mole %, and more preferably 0 to 15 mole %.

Then, these polyethylenes may preferably be modified by various reactive groups, examples of which include acid anhydride, carboxylic acid and derivatives thereof, and hydroxyl, thiol, amino, epoxy, alkoxysilyl and isocyanate groups. Those modifications are performed by publicly known copolymerization, graft polymerization and the like using, for example, maleic anhydride, citraconic anhydride, itaconic anhydride, acrylic acid, methacrylic acid, hydroxyethyl methacrylate, aminoethyl methacrylate, glycidyl methacrylate, glycidyl acrylate and the like. The amount of the modified polyethylene with these reactive groups is 0 to 25 mole %, preferably 0.01 to 15 mole %, and more preferably 0.02 to 5 mole %.

The polypropylenes which can be used as olefin resins according to the present invention are those containing 80 mole % of polypropylene units in the whole resin, and may be subjected to copolymerization or graft polymerization with other unsaturated monomers capable of copolymerization, for example, α-olefins such as ethylene, 1-butene and 1-hexene; vinyl ethers; vinyl esters such as vinyl acetate and vinyl propyonate; acrylic esters; methacrylic esters; acrylonitrile and the like, the amounts of which are in the range of 0 to 20 mole %.

Then, these polypropylenes may be modified by various reactive groups, examples of which include acid anhydride, carboxylic acid and derivatives thereof, and hydroxyl, amino, epoxy, alkoxysilyl groups and the like. Those modifications are performed by publicly known copolymerization, graft polymerization and the like using, for example, maleic anhydride, acrylic acid, methacrylic acid, hydroxyethyl methacrylate, aminoethyl methacrylate, glycidyl methacrylate and the like, preferably a modified polypropylene grafted with maleic anhydride, acrylic acid, etc. The amount of the modified polypropylene with these reactive groups is 0 to 20 mole %, and preferably 0.01 to 5 mole %. Further, a poly-4-methyl-1-pentene which can be used as an olefin resin according to the present invention, a polymer mainly composed by 4-methyl-1-pentene units, may be also modified by various reactive groups.

Furthermore, to the resin composition of the present invention may be also added a third component capable of reacting with the reactive group of the maleimide copolymer and/or olefin. Examples of the combination include maleic anhydride-modified maleimide copolymer/maleic anhydride-modified polyethylene/diamines such as diaminodiphenyl ether and the like or polyamine compounds such as a polyallylamine and the like, and carboxyl-modified maleimide copolymer/carboxyl-modified polypropylene/diepoxy compounds or epoxy resins such as diglycidyl phthalate and the like. In the resin compositions of the present invention, the content (weight ratio) of the above-mentioned resin a) N-alkyl-substituted maleimide/olefin copolymer and the resin b) polyolefin is 5-99:95-1, preferably 50-99:50-1, and more preferably 70-98:30-2.

Being modified substances of viscoelastic elastomers having glass transition temperatures of 10° C. or less, the modified elastomers in one aspect of the present invention are, but not limited to, modified substances such as diene elastomers and hydrogenated elastomers thereof, olefin elastomers, acrylic elastomers, silicone elastomers, fluorine elastomers, urethane elastomers, ester elastomers and amide elastomers. These elastomers may be modified by various reactive groups, examples of which include acid anhydride, carboxylic acid and derivatives thereof, and hydroxyl, amino, epoxy, alkoxysilyl, isocyanate groups and the like, more specifically, maleic anhydride, citraconic anhydride, itaconic anhydride, acrylic acid, methacrylic acid, itaconic acid, fumaric acid, glycidyl acrylate, glycidyl methacrylate, 2-aminoethyl acrylate, 2-aminoethyl methacrylate, 2-hydroxyethyl acrylate, 2-hydroxyethyl methacrylate, triethoxysilylpropyl acrylate, triethoxysilylpropyl methacrylate, allylamine, etc. Those modifications are performed by a publicly known method such as copolymerization or graft polymerization.

Then, examples of modified elastomers include acid anhydride-modified substances, epoxy-modified substances or hydroxy-modified substances of diene elastomers such as a polybuthadiene, a styrene/buthadiene rubber, an acrylonitrile/buthadiene rubber, an acrylonitrile/styrene/buthadiene rubber, methyl methacrylate/styrene/buthadiene, an isopropylene rubber and a chloroprene rubber; acid anhydride-modified substances, epoxy-modified substances or carboxy-modified substances of hydrogenated diene elastomers; acid anhydride-modified substances, epoxy-modified substances, carboxy-modified substances or hydroxy-modified substances of olefin elastomers such as an ethylene/propylene (ethylidene norbornene) rubber, a butyl rubber, an ethylene/vinyl acetate rubber and ethylene/methyl acrylate; acid anhydride-modified substances, epoxy-modified substances or amino-modified substances of an acrylic rubber mainly composed by ethyl acrylate; epoxy-modified substances, hydroxy-modified substances or amio-modified substances of a polysiloxane; and the like.

Selection of those elastomer components provides the resin compositions with physical properties such as low temperature izod impact strength, oil resistance, molding properties and weather resistance. The use of modified substances of diene elastomers provides them with low temperature izod impact strength, and the modified substances of olefin elastomers and acrylic elastomers provide them with weather resistance and izod impact strength.

The reactive group content of the whole elastomer is 0.001 to 30 mole %, preferably 0.01 to 20 mole %, and more preferably 0.05 to 5 mole %.

Then, to the resin composition of the present invention may be also added a third component capable of reacting with the reactive group of the maleimide copolymer and/or modified elastomer. Examples of the combination include maleic anhydride-modified maleimide copolymer/maleic anhydride-modified elastomer/diamino compounds such as diaminodiphenyl ether and the like, and hydroxy-modified maleimide copolymer/hydroxy-modified elastomer/diepoxy compounds such as diglycidyl phthalate and the like.

The polyamide resins making up the resin compositions of the present invention are polyamides obtained from the ring opening polymerization of lactam such as ε-caprolactam and ω-dodecalactam; polyamides obtained from amino acids such as 6-aminocapronic acid, 11-aminoundecanoic acid and 12-aminododecanoic acid; polyamides obtained from aliphatic, cycloaliphatic and aromatic diamines such as ethylenediamine, tetramethylenediamine, hexamethylenediamine, undecamethylenediamine, dodecamethylenediamine, 2,2,4-trimethylhexamethylenediamine, 1,3- or 1,4-bis(aminomethyl)cyclohexane, bis(4,4'-aminocyclohexyl)methane, methaxylenediamine and paraxylenediamine, and aliphatic, cycloaliphatic and aromatic dicarboxylic acid such as adipic acid, suberic acid, sebacic acid, dodecane diacid, 1,4-cyclohexnedicarboxylic acid, isophthalic acid and terephthalic acid, and copolymers and mixture thereof. Among them, nylon 6, nylon 66, nylon 610, nylon 612, nylon 11, nylon 12, nylon 46 are useful.

In general, publicly known melt polymerization, solution polymerization, solid phase polymerization and combined polymerizations thereof can be adopted as the methods for polymerizing these polyamides. Generally, the molecular weight of the polyamides preferably are, but not limited to, 10000 or more.

Some elastomers are preferably blended to the resin compositions of the present invention. The elastomers of macromolecular compounds having glass transition temperatures of 10° C. or less, which are used in resin compositions of the present invention, include olefin elastomers, diene elastomers and hydrogenated elastomers thereof, acrylic elastomers, silicone elastomers, fluorine elastomers and the like. The olefin elastomers and acrylic elastomers are preferred in terms of weather resistance, mechanical strength and the like.

Examples of olefin elastomers include a butyl rubber and an ethylene elastomer. The butyl rubber is mainly composed by a polyisobutylene. The ethylene elastomer, a polyethylenes and copolymer thereof, is composed by 50 mole % or more, preferably 75 mole % or more of ethylene units in the whole elastomer. Examples of other unsaturated monomers capable of copolymerizing with ethylene include α-olefins such as propylene, 1-butene and 1-hexene, vinyl ethers, vinyl esters such as vinyl acetate and vinyl propyonate, acrylic esters, methacrylic esters and acrylonitrile. They may be formed by copolymerization or graft polymerization according to publicly known methods.

The acrylic elastomer is mainly composed by acrylic esters such as methyl ester, ethyl ester or butyl ester of acrylic acid. Examples of other components capable of copolymerizing with them include aromatic monomers such as styrene, methacrylic esters, vinyl acetate and the like.

Those elastomers are preferably modified by various reactive groups. Examples of the reactive groups include acid anhydride, carboxylic acid and derivatives thereof, and hydroxyl, thiol, amino, epoxy, alkoxysilyl, isocyanate groups and the like. Those modifications are performed by publicly known copolymerization, graft polymerization and the like using, for example, maleic anhydride, citraconic anhydride, itaconic anhydride, acrylic acid, methacrylic acid, itaconic acid, hydroxyethyl methacrylate, aminoethyl methacrylate, glycidyl methacrylate, glycidyl acrylate, 3-(triethoxysilyl)propyl methacrylate and the like. The amount of the modified elastomer with these reactive groups is 0 to 25 mole %, preferably 0.01 to 15 mole %, and more preferably 0.02 to 5 mole %.

More practical examples of these elastomers include an ehtylene/propylene rubber and acid anhydride-modified substance thereof, a carboxylic acid-modified substance, a glycidly methacrylate-modified substance, an ethylene/acrylic acid copolymer, an ethylene/glycidyl methacrylate copolymer, an ethylene/ethyl acrylate/glycidyl methacrylate copolymer, an ethylene/ethyl acrylate/maleic anhydride copolymer, an ethylene/vinyl acetate/maleic anhydride copolymer, an ethyl acrylate/glycidyl methacrylate copolymer, and ethyl acrylate/butyl acrylate/maleic anhydride copolymer and the like.

In the resin compositions of the present invention, the content (weight ratio) of an N-alkyl-substituted maleimide/olefin copolymer, a polyamide resin and an elastomer is 1-99:99-1:0-40, preferably 5-95:95-5:0-30, and more preferably 10-75:90-25:1-25. When the content of the maleimide copolymer is 1% by weight or less, a resin with poor heat resistance and low rigidity is undesirably obtained. On the other hand, when the elastomer content is 40% by weight or more, a resin with possibly decreased heat resistance and rigidity is undesirably obtained.

Examples of the polyester resin used in the resin composition of the present invention include a polybutylene terephthalate, a polyethylene terephthalate, a polyacrylate, a liquid-crystalline polyester and the like.

Examples of the elastomers used in the resin compositions of the present invention include diene elastomers and hydrogenated substances thereof such as a polybuthadiene, a styrene/buthadiene copolymer, an acrylonitrile/buthadiene copolymer, an acrylonitrile/styrene/buthadiene copolymer, a methyl methacrylate/styrene/buthadiene copolymer, a polyisopulene and a polychloroprene; olefin elastomers such as an ethylene/propylene (ethylidene norbornene) rubber, a butyl rubber, an ethylene/vinyl acetate rubber and ethylene/methyl acrylate; an acrylic rubber mainly composed by acrylic ester, silicone elastomers, fluorine elastomers, urethane elastomers, ester elastomers, amido elastomers and the like.

The above-mentioned elastomers are preferably modified by the reactive groups such as acid anhydride, carboxylic acid, epoxy, hydroxyl, amino, alkoxysilyl and isocyanate groups. Then the content of the reactive group is 0.001 to 30 mole % of the whole elastomer, preferably 0.01 to 20 mole %, and more preferably 0.05 to 5 mole %.

Then, various kinds of catalysts may be added to this system in order to promote the reaction of a maleimide copolymer, polyester resin and elastomer.

Further, dispersibility and compatibility of each component may be improved by blending polyamino compounds such as a diaminodiphenyl ether, polyepoxy compound; such as a resorcin glycidyl ether and a diglycidyl phthalic ehter; components capable of reacting with a maleimide copolyers, a polyester resin, an elastomer and the like.

In the present invention, the content (weight ratio) of an alkylmaleimide/olefin copolymer, a polyester resin and an elastomer is 1-99:99-1:0-40, preferably 5-95:95-5:5-40, and more preferably 10-75:90-25:10-30. When the content of the alkylmaleimide/olefin copolymer is 1% by weight or less, a resin with poor heat resistance and low rigidity is undesirably obtained. On the other hand, when the elastomer content is 40% by weight or more, a resin with low rigidity is undesirably obtained.

To the resin compositions of the present invention may be blended other resins, for example, an acrylic resin, a polystyrene, a vinyl chloride resin, a polyphenylene ether, a polyacetal, a polyamide, a polyester, a polyphenylene sulfide, a polyimide, polycarbonate, a polysulfone and a fluorine resin, and an elastomer such as a diene elstomer, an olefin elastomer, acrylic elastomer, an urethane elastomer, a fluorine elastomer or a silicone elastomer, and a random, block and graft polymer thereof and the like.

Further, the above-mentioned maleimide and olefins are polymerized in the presence of rubber-like polymers, and the resulting graft polymers may be used.

At the time of practical use, to the resin compositions of the present invention may be blended inorganic and organic fillers such as various kinds of dye, glass fibers whose surface may be treated, carbon fibers, potassium titanate, asbestos, silicone carbide, ceramic fibers, metal fibers, silicone nitride, barium sulfate, potassium sulfate, kaolin, clay, pyrophyllite, zeolite, mica, talc, ferrite, calcium silicate, calcium carbonate, magnesium carbonate, antimony trioxide, zinc oxide, titanium oxide, iron oxide, glass balloon and aramide fiber; heat stabilizers such as hindered phenol and organic phosphoric ester; ultraviolet light stabilizer of benzotriazol series or hindered amine series and the like; flame retarders, blowing agents, antistatic agents, various kinds of lubricant and the like. Further, the molding objects may be plated, coated, printed and the like.

Though not limited, the methods for preparing the resin compositions of the present invention include, for example, a method in which an N-alkyl-substituted maleimide/olefin copolymer in the form of powder or pellet and other additives are blended, or they are supplied in an extruder without blending and then melt-kneaded.

EXAMPLES

The resin compositions of the present invention are illustrated with reference to the following examples, but the invention is not intended to be limited only to these following examples.

The molecular weights of the prepared polymers were calculated by converting into those of polystyrenes using GPC (HLC-802A, TOSOH CORPORATION).

The composition of the prepared polymers was mainly determined by elemental analysis and $^1$N-NMR spectrometry.

The weather resistance of the prepared polymers was estimated from changes in physical properties and appearance after irradiation for 200 hours using a Weather meter (Suga Test Apparatus Co., Ltd.).

The heat distortion temperature, flexural stiffness and flexural modulus, and izod impact strength of the prepared polymers were determined according to ASTM D648, ASTM D790 and ASTM D256, respectively.

(Reference Example 1)

Preparation of N-alkyl-substituted maleimide/olefin copolymers

A-1

Into an autoclave (50 liters) having a stirring machine, nitrogen-introducing tube, thermometer and deaerating tube were placed 2780 g (25 mole) of N-methyl maleimide, 71 g (0.5 mole) of glycidyl methacrylate, 3.2 g (0.02 mole) of 2,2'-azobisisobutyronitrile (AIBN) and 35 liters of dioxane. After the mixture was purged with nitrogen several times, 5610 g (100 mole) of isobuthene was added, and then reacted at 60° C. for 12 hours.

The reaction contents were poured into ethanol to separate out a polymer. The polymer was dried under reduced pressure at 60° C. for 24 hours, with the yield of 1.75 g. By subjecting the resulting polymer to elemental analysis and $^1$N-NMR spectrometry, it was found that the prepared polymer contained the maleimide units of 49.5 mole % and glycidylmethacrylate units of 0.8 mole %. The resulting polymer had a molecular weight (MW) of 213000.

A-2

Into the same reactor as used in A-1 were placed 2780 g (25 mole) of N-methyl maleimide, 48 g (0.4 mole) of 4-aminostyrene, 3.2 g (0.02 mole) of 2,2'-azobisisobutyronitrile (AIBN) and 35 liters of dioxane. After the mixture was purged with nitrogen several times, 5610 g (50 mole) of isobuthene was added, and then it was reacted at 60° C. for 12 hours.

The reaction contents were poured into ethanol to separate out a polymer. The polymer was dried under reduced pressure at 60° C. for 24 hours, with the yield of 4182 g. By subjecting the resulting polymer to elemental analysis and $^1$N-NMR spectrometry, it was found that the prepared polymer contained the maleimide units of 50.0 mole % and 4-aminostyrene units of 1.0 mole %. The resulting polymer had a molecular weight (MW) of 250000.

A-3

An N-cyclohexyl maleimide/glycidyl methacrylate/isobuthene copolymer was prepared by the same method as in A-1 except that N-cyclohexyl maleimide was used in place of N-methyl maleimide.

The results of the prepared polymer by elemental analysis showed the polymer contained maleimide units of 51 mole % and glycidylmethacrylate units of 0.6 mole %. The resulting polymer had a molecular weight (MW) of 277000.

A-4

An N-methyl maleimide/isobuthene copolymer was prepared by the same method as used in A-1 without glycidyl methacrylate. The prepared polymer had maleimide units of 50 mole % and a molecular weight (MW) of 240000.

B-1

A copolymer consisting of ethylene units of 91.86 mole %, ethyl acrylate units of 7.93 mole % and maleic anhydride units of 0.21 mole %.

B-2

A copolymer consisting of ethylene units of 97.20 mole %, glycidyl methacrylate units of 2.80 mole %.

B-3

An modified polypropylene which is modified by the reaction extrusion technique, and in which 0.4 mole % of maleic anhydride units are grafted.

(Examples 1-6 and Comparative Example 1)

The maleimide/isobuthene copolymers and olefin resins prepared in the Reference Example were previously shaken and blended in the form of powder or pellet of the resin compositions shown in Table 1, and then kneaded and extruded using a biaxial extruder (Laboplastomill; Toyo Seiki Co., Ltd.) twice at 260° to 320° C. to form pellets. The resulting pellets were injection-molded using an injection molding press (Panajection; Matsushita Electric Industrial Co., Ltd.) at cylinder temperatures of 260° to 350° C. and mold temperatures of 100° to 140° C. to prepare samples for measuring physical properties. The obtained results are shown in Tables 1 to 4.

TABLE 1

| Sample | Maleimide copolymer by (% by weight) | Olefin resin (% by weight) |
|---|---|---|
| Example | | |
| 1 | A-1 (80) | B-1 (20) |
| 2 | A-1 (75) | B-2 (25) |
| 3 | A-1 (85) | B-3 (15) |
| 4 | A-2 (80) | B-1 (20) |
| 5 | A-3 (75) | B-1 (25) |
| 6 | A-4 (80) | B-2 (20) |
| Comparative Example 1 | A-4 (100) | — |

TABLE 2

| Sample | Heat distortion temperature (°C.) | Flexural Stiffness (kg/cm$^2$) | Flexural modulus (kg/cm$^2$) | Izod impact strength (kg.cm/cm) |
|---|---|---|---|---|
| Example | | | | |
| 1 | 157 | 1020 | 38000 | 32 |
| 2 | 152 | 920 | 34000 | 48 |
| 3 | 155 | 780 | 33000 | 18 |
| 4 | 155 | 920 | 35000 | 24 |
| 5 | 180 | 780 | 25000 | 12 |
| 6 | 153 | 730 | 31000 | 8 |
| Comparative Example 1 | 158 | 1350 | 48500 | 2 |

TABLE 3

| Sample | Coefficient of linear thermal expansion ($\times 10^{-5}$ cm/cm °C.) | Molding shrinkage (%) | Dimensional* change rate (%) |
|---|---|---|---|
| Example | | | |
| 1 | 5.0 | 0.4 | 0.04 |
| 2 | 5.6 | 0.5 | 0.04 |
| 3 | 5.1 | 0.6 | 0.05 |
| 4 | 5.2 | 0.5 | 0.04 |
| 5 | 5.7 | 0.5 | 0.05 |
| 6 | 5.2 | 0.5 | 0.04 |
| Comparative Example 1 | 4.8 | 0.4 | 0.08 |

*After immersion in water at 23° C. for 24 hours.

TABLE 4

| | Before irradiation | | After irradiation | |
|---|---|---|---|---|
| Sample | flexural stiffness (kg/cm$^2$) | Izod impact strength (kg.cm/cm) | flexural stiffness (kg/cm$^2$) | Izod impact strength (kg.cm/cm) |
| Example | | | | |
| 1 | 1020 | 32 | 1100 | 32 |
| 2 | 920 | 48 | 930 | 49 |
| 3 | 780 | 18 | 760 | 16 |
| 4 | 920 | 24 | 920 | 25 |
| 5 | 780 | 12 | 730 | 10 |
| 6 | 730 | 8 | 730 | 7 |
| Comparative Example 1 | 1350 | 2 | 1380 | 2 |

(Reference Example 2)

Preparation of N-alkyl-substituted maleimide/olefin copolymers

A-5

Into an autoclave (50 liters) having a stirring machine, nitrogen-introducing tube, thermometer and de-aerating tube were placed 2780 g (25 mole) of N-methyl maleimide, 65 g (0.5 mole) of 2-hydroxyethyl methacrylate, 3.2 g (0.02 mole) of 2,2'-azobisisobutyronitrile (AIBN) and 35 liters of dioxane. After the mixture was purged with nitrogen several times, 5610 g (100 mole) of isobuthene was added, and then reacted at 60° C. for 12 hours.

The reaction contents were poured into ethanol to separate out a polymer. The polymer was dried under reduced pressure at 60° C. for 24 hours, with the yield of 4180 g. By subjecting the resulting polymer to elemental analysis and $^1$N-NMR spectrometry, it was found that the prepared polymer contained the maleimide units of 49.5 mole % and glycidylmethacrylate units of 0.8 mole %. The resulting polymer had a molecular weight (MW) of 232000.

A-6

Into the same reactor s used in A-5 were placed 2780 g (25 mole) of N-methyl maleimide, 49 g (0.5 mole) of maleic anhydride 3.2 g (0.02 mole) of 2,2'-azobisisobutyronitrile (AIBN) and 35 liters of dioxane. After the mixture was purged with nitrogen several times, 5610 g (50 mole) of isobuthene was added, and then reacted at 60° C. for 12 hours.

The reaction contents were poured into ethanol to separate out a polymer. The polymer was dried under reduced pressure at 60° C. for 24 hours, with the yield of 4182 g. By subjecting the resulting polymer to elemental analysis and $^1$N-NMR spectrometry, it was found that the prepared polymer contained the maleimide units of 49.0 mole % and maleic anhydride units of 1.0 mole %. The resulting polymer had a molecular weight (MW) of 250000.

A-7

An N-cyclohexyl maleimide/maleic anhydride/isobuthene copolymer was prepared by the same method as used in A-6 except that N-cyclohexyl maleimide was used in place of N-methyl maleimide.

The results of the prepared polymer by elemental analysis showed the polymer contained maleimide units of 51 mole % and maleic anhydride units of 1.0 mole %. The resulting polymer had a molecular weight (MW) of 197000.

A-8

An N-methyl maleimide/isobuthene copolymer was prepared by the same method as used in A-5 without 2-hydroxyethyl methacrylate. The prepared polymer had maleimide units of 50 mole % and a molecular weight (MW) of 240000.

Modified elastomers

B-4

An acrylonitrile/buthadiene/glycidyl methacrylane copolymer was prepared by the publicly known emulsion polymerization. The resulting copolymer consisted of acrylonitrile of 35 mole %, buthadiene of 62 mole %, and glycidyl methacrylate of 3 mole %, with Mooney viscosity of 44.

B-5

There as used a commercial available acrylonitrile/buthadiene rubber (Japan Synthetic Lubber Co., Ltd.), with Mooney viscosity of 45.

B-6

A modified copolymer consisting of ethyl acrylate of 60 mole %, butyl acrylate of 38 mole %, and glycidyl methacrylate of 2 mole % was prepared by the publicly known suspension polymerization.

B-7

A copolymer consisting of ethyl acrylate of 60 mole %, and butyl acrylate of 40 mole % was prepared by the publicly known suspension polymerization.

B-8

A modified elastomer was prepared using an ethylene/propylene/ethylidenenorbornene elastomer having 1.5 mole % of maleic anhydride graft-polymerized by the reaction extrusion method.

B-9

There was used a commercially available ethylene/propylene rubber (Japan Synthetic Lubber Co., Ltd.), with Mooney viscosity of 42.

(Examples 7–11 and Comparative Examples 2–5)

The maleimide copolymers and modified elastomers were previously shaken and blended in the form of powder or pellet of the resin compositions shown in Table 5, and then kneaded and extruded using a biaxial extruder (Laboplastomill; Toyo Seiki Co., Ltd.) twice at 260° to 320° C. to form pellets. The resulting pellets were injection-molded using an injection molding press (Panajection; Matsushita Electric Industrial Company Co., Ltd.) at cylinder temperatures of 260° to 350° C. and mold temperatures of 100° to 140° C. to prepare samples for measuring physical properties.

The heat distortion temperature, coefficient of linear thermal expansion, flexural stiffness and flexural modulus, and izod impact strength of the prepared samples were determined according to ASTM D648, ASTM D694, ASTM D790 and ASTM D256, respectively. The obtained results are shown in Table 6.

Figure 1:
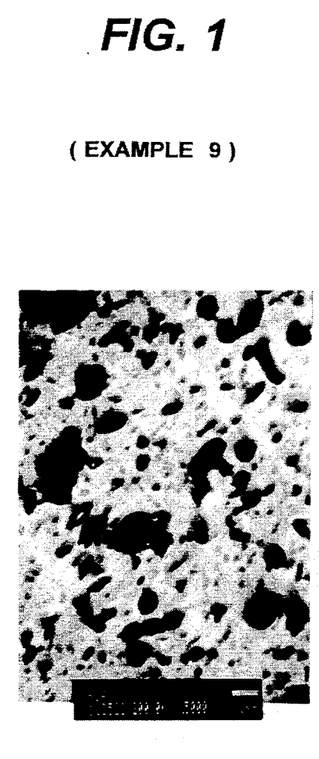
FIG. 1 is a microphotograph (TEM) of an interface of the sample obtained by Example 9 and FIG. 2 is a microphotograph (TEM) of an interface of the sample obtained by Comparative Example 5.
Figure 2:
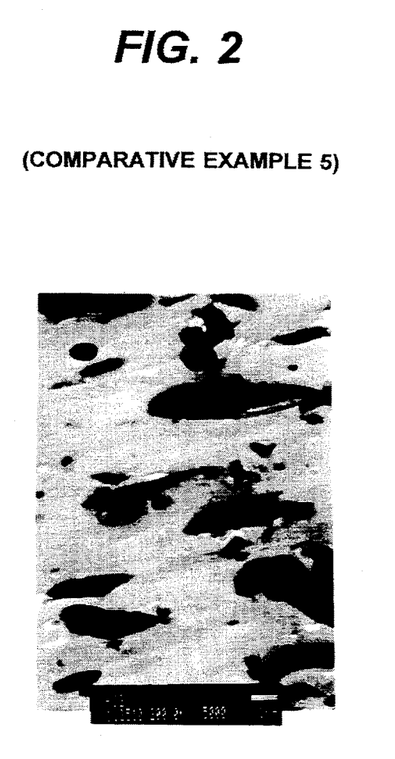

The interface microstructures of the samples obtained by Example 9 and Comparative Example 5 are shown by FIG. 1 and FIG. 2 respectively. Form the photographs it is understood individual components are more finely dispersed in Example 9 than in Comparative Example 5.

TABLE 5

|  | Maleimide copolymer (% by weight) | Elastomer (% by weight) |
| --- | --- | --- |
| Example |  |  |
| 7 | A-5 (80) | B-4 (20) |
| 8 | A-5 (75) | B-6 (25) |
| 9 | A-5 (85) | B-8 (15) |
| 10 | A-6 (70) | B-8 (30)* |
| 11 | A-7 (80) | B-6 (20) |
| Comparative Example |  |  |
| 2 | A-8 (100) | — |
| 3 | A-8 (80) | B-5 (20) |
| 4 | A-8 (75) | B-7 (25) |
| 5 | A-8 (85) | B-9 (15) |

*5000 ppm diaminodiphenyl ether was blended.

TABLE 6

| Sample | Heat distortion temperature (°C.) | Coefficient of linear thermal expansion ($\times 10^{-5}$ cm/cm °C.) | Flexural stiffness (kg/cm$^2$) | Flexural modulus (kg/cm$^2$) | Izod impact strength (kg.cm/cm) |
| --- | --- | --- | --- | --- | --- |
| Example |  |  |  |  |  |
| 7 | 160 | 5.1 | 920 | 35000 | 28 |
| 8 | 157 | 5.2 | 850 | 29000 | 45 |
| 9 | 158 | 5.0 | 890 | 32000 | 35 |
| 10 | 156 | 5.1 | 820 | 27000 | 52 |
| 11 | 178 | 5.5 | 780 | 24000 | 21 |
| Comparative Example |  |  |  |  |  |
| 2 | 158 | 4.9 | 1200 | 48000 | 2 |
| 3 | 152 | 5.3 | 330 | 29000 | 3 |
| 4 | 142 | 7.0 | 280 | 20000 | 3 |
| 5 | 148 | 6.8 | 460 | 21000 | 2 |

(Reference Example 3)

Preparation of N-alkyl-substituted maleimide/olefin copolymers

A-9

Into an autoclave (50 liters) having a stirring machine, nitrogen-introducing tube, thermometer and de-aerating tube were placed 2780 g (25 mole) of N-methyl maleimide, 3.2 g (0.02 mole) of 2,2'-azobisisobutyronitrile (AIBN) and 40 liters of dioxane. After the mixture was purged with nitrogen several times, 2805 g (50 mole) of isobuthene was added, and then reacted at 60° C. for 12 hours.

The reaction contents were poured into ethanol to separate out a polymer. The resulting polymer was purified by reprecipitation with dioxane/ethanol, and then dried under reduced pressure at 60° C. for 24 hours, with the yield of 4030 g. By subjecting the resulting polymer to elemental analysis (C: 64.7% by weight; H: 7.8% by weight; and N: 8.4% by weight), it was found that the prepared polymer contained the maleimide units of 50 mole % and a molecular weight of 223000.

A-10

Into the same autoclave as used in A-9 were placed 2780 g (25 mole) of N-methyl maleimide, 71 g (0.5 mole) of glycidyl methacrylate, 3.2 g (0.02 mole) of 2,2'-azobisisobutyronitrile (AIBN) and 35 liters of dioxane. After the mixture was purged with nitrogen several times, 5610 g (100 mole) of isobuthene was added, and then it was reacted at 60° C. for 12 hours.

The reaction contents were poured into ethanol to separate out a polymer. The polymer was dried under reduced pressure at 60° C. for 24 hours, with the yield of 4175 g.

By subjecting the resulting polymer to elemental analysis and $^1$N-NMR spectrometry, it was found that the prepared polymer contained the maleimide units of 49.5 mole % and glycidyl methacrylate units of 0.8 mole %. The resulting polymer had a molecular weight (MW) of 213000.

A-11

Into the same autoclave as used in A-9 were placed 2780 g (25 mole) of N-methyl maleimide, 49 g (0.5 mole) of maleic anhydride, 3.2 g (0.02 mole) of 2,2'-azobisisobutyronitrile (AIBN) and 35 liters of dioxane. After the mixture was purged with nitrogen several times, 5610 g (100 mole) of isobuthene was added, and then it was reacted at 60° C. for 12 hours.

The reaction contents were poured into ethanol to separate out a polymer. The polymer was dried under reduced pressure at 60° C. for 24 hours, with the yield of 4182 g.

By subjecting the resulting polymer to elemental analysis and the acid anhydride whose groups were methyl-esterificated to $^1$N-NMR spectrometry, it was found that the prepared polymer contained the maleimide units of 49.0 mole % and maleic anhydride units of 1.0 mole %. The resulting polymer had a molecular weight (MW) of 250000.

A-12

An N-cyclohexyl maleimide/glycidyl methacrylate/isobuthene copolymer was prepared by the same method as used in A-10 except that N-cyclhexyl maleimide was used in place of N-methyl maleimide.

The results of the prepared polymer by elemental analysis and $^1$N-NMR spectrometry showed the polymer contained maleimide units of 51 mole % glycidyl methacrylate units of 0.6 mole %. The resulting polymer had a molecular weight (MW) of 277000.

Polyamides and elastomers

B-10

Nylon 6 (UBE Nylon 1013 B, UBE INDUSTRIES LTD.)

B-11

Nylon 66 (UBE Nylon 2020 B, UBE INDUSTRIES LTD.)

C-1

A copolymer consisting of ethylene units of 91.86 mole %, ethyl acrylate units of 7.93 mole % and maleic anhydride units of 0.21 mole %.

C-2

A modified ethylene/propylene elastomer in which an ethylene/propylene copolymer consisting of ethylene units of 75 mole % and propylene units of 25 mole % and maleic anhydride of 1 mole % is graft-polymerized by the reaction extrusion technique.

C-3

A copolymer consisting of ethyl acrylate units of 60 mole %, butyl acrylate units of 38 mole %, and glycidyl methacrylate units of 2 mole %.

(Example 12)

The N-methyl maleimide/isobuthene copolymer (A-9), polyamide resin (B-10) and elastomer (C-3) prepared in the Reference Example 3 were previously shaken and blended in the form of powder or pellet with composition shown in Table 1, and then kneaded and extruded using a biaxial extruder (Laboplastomill; Toyo Seiki Co., Ltd.) under the atomosphere of nitrogen twice at 240° to 280° C. to form pellets. The resulting milk-white pellets were injection-molded using an injection molding press (Panajection; Matsushita Electric Industrial Co., Ltd.) at injection molding temperatures of 300° C. and molded at mold temperatures of 100° C. to prepare samples for measuring physical properties. The obtained results are shown in Table 8.

(Examples 13–17 and Comparative Examples 6–7)

As in Example 12, the resin compositions shown in Table 7 were melt-kneaded at 260° to 350° C. to form pellets, which were injection-molded at cylinder temperatures of 260° to 350° C. and mold temperatures of 80° to 140° C. to prepare samples. These samples were measured for physical properties. The obtained results are shown in Table 8.

TABLE 7

| Example | Maleimide copolymer (% by weight) | Amide resin (% by weight) | Elastomer (% by weight) |
|---|---|---|---|
| 12 | A-9 (32) | B-10 (55) | C-3 (10) |
| 13 | A-10 (75) | B-10 (53) | C-1 (15) |
| 14 | A-11 (25) | B-10 (63) | C-2 (12) |
| 15 | A-10 (45) | B-11 (45) | C-2 (25) |
| 16 | A-12 (35) | B-11 (40) | — |

TABLE 7-continued

| | Maleimide copolymer (% by weight) | Amide resin (% by weight) | Elastomer (% by weight) |
|---|---|---|---|
| 17 | A-11 (38) | B-11 (62) | — |
| Comparative Example | | | |
| 6 | — | B-10 (100) | — |
| 7 | — | B-11 (100) | — |

TABLE 8

| Sample | Heat distortion temperature (°C.) | Flexural stiffness (kg/cm²) | Flexural modulus (kg/cm²) | Izod impact strength (kg.cm/cm) before irradiation | Izod impact strength (kg.cm/cm) after irradiation |
|---|---|---|---|---|---|
| Example | | | | | |
| 12 | 160 | 1220 | 38000 | 25 | 23 |
| 13 | 156 | 1020 | 35000 | 38 | 39 |
| 14 | 155 | 880 | 33000 | 22 | 22 |
| 15 | 157 | 920 | 35000 | 24 | 21 |
| 16 | 181 | 780 | 28000 | 14 | 12 |
| 17 | 160 | 1260 | 40000 | 11 | 12 |
| Comparative Example | | | | | |
| 6 | 60 | 1100 | 29000 | 6 | — |
| 7 | 70 | 1100 | 29000 | 3 | — |

(Reference Example 4)

Preparation of N-alkyl-substituted maleimide/olefin copolymers

A-13

Into an autoclave (30 liters) having a stirring machine, isobuthene-introducing tube, thermometer and deaerating tube were placed 1180 g of N-methyl maleimide, 153 g of 2-hydroxyethyl methacrylate, 8 g of perbutyl neodecanate and 15 liters of a toluene/methanol-mixed solvent (an weight ratio of 1:1). After the mixture was purged with nitrogen several times, 8.5 liters of liquefied isobuthene was added, and then reacted at 60° C. for 12 hours.

The particulate polymer obtained from the reaction was separated out by centrifugation and dried under reduced pressure at 60° C. for 24 hours, with the yield of 1770 g. The resulting polymer was reprecipitated with a chloroform/methanol solvent; then by subjecting the polymer to elemental analysis and $^1$N-NMR spectrometry, it was found that the prepared polymer contained the maleimide units of 49.5 mole %, 2-hydroxyethyl methacrylate units of 1.0 mole % and isobuthene units of 49.5 mole %. The resulting polymer had a molecular weight (MW) of 265000.

A-14

Into the same reactor as used in A-13 were placed 1180 g N-methylmaleimide, 23 g of maleic anhydride, 8 g of perbutyl neodecanate and 15 liters of a toluene/methanol-mixed solvent (an weight ratio of 1:1). After the mixture was purged with nitrogen several times, 8.5 liters of liquefied isobuthene was added, and then reacted at 60° C. for 12 hours.

The particulate polymer obtained from the reaction was separated out by centrifugation and dried under reduced pressure at 60° C. for 24 hours, with the yield of 1750 g. By subjecting the resulting polymer to elemental analysis, and by subjecting the maleic anhydride portion of the polymer to $^1$N-NMR spectrometry, it was found that the prepared polymer contained the maleimide units of 49 mole %, maleic anhydride units of 1.0 mole % and isobuthene units of 50 mole %. The resulting polymer had a molecular weight (MW) of 270000.

Polyester resin

B-12

Polybuthylene terephthalate (UBE Nylon 2020 B, NOVADUR, Mitsubishi Kasei Corp.)

Elastomers

C-4

A copolymer consisting of ethylene units of 97.20 mole % and glycidyl methacrylate units of 2.80 mole %.

C-5

An ethylene/propylene elastomer consisting of ethylene units of 73% by weight and propylene units of 27% by weight which was modified with 0.5% by weight.

(Examples 18–21 and Comparative Example 8)

The maleimide-isobuthene copolymers, polybuthylene terephthalate resins and elastomers shown in Reference Example 4 were previously shaken and blended in the form of powder or pellet of the resin compositions (weight ratio) shown in Table 9, and then kneaded and extruded using a biaxial extruder (Laboplastomill; Toyo Seiki Co., Ltd.) twice at 260° to 320° C. to form pellets. The resulting pellets were injection-molded using an injection molding press (Panajection; Matsushita Electric Industrial Co., Ltd.) at cylinder temperatures of 260° to 350° C. and mold temperatures of 100° to 140° C. to prepare samples for measuring physical properties. The obtained results are shown in Table 10.

TABLE 9

| | Maleimide copolymer (% by weight) | Amide resin (% by weight) | Elastomer (% by weight) |
|---|---|---|---|
| Example | | | |
| 18 | A-13 (35) | B-12 (55) | C-4 (10) |
| 19 | A-13 (40) | B-12 (45) | C-4 (15) |
| 20 | A-14 (45) | B-12 (43) | C-5 (12) |
| 21 | A-14 (38) | B-12 (45) | C-5 (17) |
| Comparative Example 8 | — | B-12 (90) | C-5 (10) |

TABLE 10

| Sample | Heat distortion temperature (°C.) | Flexural stiffness (kg/cm²) | Flexural modulus (kg/cm²) | Izod impact strength (kg.cm/cm) |
|---|---|---|---|---|
| Example | | | | |
| 18 | 138 | 1220 | 35000 | 24 |
| 19 | 145 | 960 | 34000 | 29 |
| 20 | 150 | 1020 | 33000 | 20 |
| 21 | 145 | 880 | 30000 | 25 |
| Comparative Example 8 | 54 | 680 | 20000 | 13 |

What is claimed is:

1. A heat-resistant resin composition comprising:
    (a) a resin containing 30 to 98 mole % of component (I):

wherein $R_1$ is an alkyl group having 1 to 18 carbon atoms or a cycloalkyl group having 3 to 12 carbon atoms; and 70 to 2 mole % of component II:

wherein $R_2$ is hydrogen or an alkyl group having 1 to 8 carbon atoms, and $R_3$ and $R_4$ are independently alkyl groups having 1 to 8 carbon atoms, wherein components I and II are contained in the whole polymer, its weight-average molecular weight converted into that of polystyrene being $1 \times 10^3$ to $5 \times 10^6$, and (b) a modified elastomer, the weight ratio of (a)/(b) being 5/95 to 99/1.

2. The heat-resistant resin composition as claimed in claim 1 wherein $R_1$ is methyl, ethyl, isopropyl or cyclohexyl.

3. The heat-resistant resin composition as claimed in claim 1 wherein $R_2$ is hydrogen, $R_3$ and $R_4$ are both methyl.

4. The heat-resistant resin composition as claimed in claim 1 wherein said olefin resin is polyethylene, polypropylene or poly-4-methyl-1-pentene.

5. The heat-resistant resin composition as claimed in claim 1 wherein said modified elastomer is selected from the group consisting of diene elastomers and hydrogenated elastomers thereof, olefin elastomers, acrylic elastomers, silicone elastomers, fluorine elastomers, urethane elastomers, ester elastomers and amide elastomers.

6. The heat-resistant resin composition according to claim 1 wherein resin (a) is modified with a reactive group.

7. The heat-resistant resin composition according to claim 5 wherein said reactive group is selected from the group consisting of carboxylic acids, their derivatives, acid anhydrides, hydroxyl, amino, thiol, epoxy, alkoxyl and isocyanate groups.

8. The heat-resistant resin composition according to claim 1 wherein said modified elastomer is modified with a reactive group selected from the group consisting of carboxylic acids, their derivatives, acid anhydrides, hydroxyl, amino, thiol, epoxy, alkoxyl and isocyanate groups.

9. The heat-resistant resin composition according to claim 1, wherein the modified elastomer is modified polyethylene or modified polypropylene.

* * * * *